(12) United States Patent
Masuyama (10) Patent No.: US 7,292,275 B2
(45) Date of Patent: Nov. 6, 2007

(54) EXPOSURE CONTROL DEVICE FOR MICROSCOPE IMAGING

(75) Inventor: Hideyuki Masuyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 949 days.

(21) Appl. No.: 10/102,097

(22) Filed: Mar. 19, 2002

(65) Prior Publication Data

US 2002/0141049 A1 Oct. 3, 2002

(30) Foreign Application Priority Data

Mar. 22, 2001 (JP) ............................ 2001-083706

(51) Int. Cl.
*H04N 3/14* (2006.01)
*H04N 5/235* (2006.01)

(52) U.S. Cl. ................. 348/297; 348/221.1; 348/230.1

(58) Field of Classification Search ..................... None
See application file for complete search history.

(56) References Cited

U.S. PATENT DOCUMENTS

| 6,421,087 B1 * | 7/2002 | Ikeda .......................... 348/345 |
| 6,462,771 B1 * | 10/2002 | Kitagawa ...................... 348/79 |
| 6,583,928 B2 * | 6/2003 | Ooki et al. .................. 359/388 |
| 6,785,414 B1 * | 8/2004 | McStravick et al. ......... 382/162 |
| 6,836,288 B1 * | 12/2004 | Lewis ....................... 348/229.1 |
| 2003/0016301 A1 * | 1/2003 | Aizaki et al. ................ 348/345 |

FOREIGN PATENT DOCUMENTS

JP 05-056331 3/1993

* cited by examiner

*Primary Examiner*—Vivek Srivastava
*Assistant Examiner*—Hung H. Lam
(74) *Attorney, Agent, or Firm*—Frishauf, Holtz, Goodman & Chick, P.C.

(57) ABSTRACT

An imaging apparatus for a microscope comprises light receiving means having a plurality of light receiving segments arranged two-dimensionally for receiving an observed image on the microscope, extracting means for extracting light receiving outputs in a predetermined level range from the light receiving outputs of the respective light receiving segments of the light receiving means, exposure calculating means for performing an exposure calculation based on an average value of the light receiving outputs extracted from the extracting means, exposure control means for performing exposure control of the light receiving means in accordance with an exposure time calculated by the exposure calculation means, and image acquiring means for acquiring a taken image corresponding to the observed image from the light receiving outputs of the light receiving segments after the exposure control.

6 Claims, 8 Drawing Sheets

EXPOSURE CONTROL DEVICE FOR MICROSCOPE IMAGING

CROSS-REFERENCE TO RELATED APPLICATIONS

This application is based upon and claims the benefit of priority from the prior Japanese Patent Application No. 2001-083706, field Mar. 22, 2001, the entire contents of which are incorporated herein by its reference.

BACKGROUND OF THE INVENTION

1. Field of the Invention

The present invention relates to an imaging apparatus for a microscope which takes an observed image on the microscope.

2. Description of the Related Art

Conventionally, an imaging apparatus for a microscope is used for taking an observed image on the microscope with the use of an image taking means, such as a CCD, as a peripheral device.

Incidentally, since different brightness occurs from spot to spot on a sample depending upon the kinds of samples or the observation methods, the observed image sometimes involves dotted high and low bright spots.

When light is measured, on the average, over a whole image-taking range of such an observed image and an image is taken with an exposure time based on the measured value, an image with an incorrect exposure is obtained because a greater adverse effect is gained from a background than the dotted radiation spots. For example, an observed image of a fluorescent sample is dotted with high brightness radiation spots in a dark background. If, therefore, light is measured, on the average, over a whole image-taking range, the exposure time is simply calculated from the measured value with the use of a known calculation equation and an image is taken based on the exposure time, then the dark background is brightly imaged and a high fluorescent brightness spot as an object of interest is over-exposed.

Conventionally, a method disclosed in JPN PAT APPLN KOKAI Publication No. 5-56331 is provided as the image-taking technique using such a subject as an object of image taking. This method disclosed in the KOKAI Publication is used to image a subject with a spot light formed at a portion of a dark background. First, the light measuring range is divided into 24 areas, the brightness levels of the respective areas are detected and a brightness histogram is prepared from the detected brightness levels. And from the brightness histogram the upper N (=2) areas are extracted and AE control is performed based on the N areas only. The brightness levels of the N areas are averaged and the average brightness level is compared with an initially set threshold value y1. If the average brightness level is higher than y1, then with a gain fixed 0 dB an iris is so controlled as to set the average brightness level to 50 IRE and, by doing so, AE control is performed. If, on the other hand, the average brightness level is lower than y1, then with the iris fully opened a gain is so controlled as to set the average brightness level to 50 IRE and, by doing so, AE control is performed.

Incidentally, the method disclosed in the JPN PAT APPLN KOKAI Publication No. 5-56331 adjusts the brightness level by the gain control at the time of taking an image corresponding to high brightness spots dotted in a dark background such as a fluorescent image taking. In this case, the signal-to-noise ratio is adversely affected. Since the areas used under the AE control are fixed to the upper N areas, defects or dirt on the sample are higher in brightness than radiance spots as an object of image taking and the radiance spots become under-exposed.

BRIEF SUMMARY OF THE INVENTION

It is accordingly the object of the present invention to provide an imaging apparatus for a microscope which can obtain an image with correct exposure even if an object is dotted with higher or lower brightness radiance spots under a greater brightness difference of a sample.

In a first aspect of the present invention there is provided an imaging apparatus for a microscope which comprises: light receiving means having a plurality of light receiving segments arranged two-dimensionally for receiving light corresponding to an observed image on the microscope; extracting means for extracting light receiving outputs in a predetermined level range from the light receiving outputs of the light receiving segments of the light receiving means; exposure calculating means for performing an exposure calculation based on an average value of the light receiving outputs extracted from the extracting means; exposure control means for performing exposure control of the light receiving means in accordance with an exposure time calculated by the exposure calculating means; and image acquiring means for acquiring a taken image corresponding to the observed image from the light receiving outputs of the light receiving segments after the exposure control.

In a second aspect of the present invention there is provided an imaging apparatus for a microscope which comprises: light receiving means having a plurality of light receiving segments arranged two-dimensionally for receiving light corresponding to an observed image on the microscope; light receiving data storing means for storing light receiving outputs from respective light receiving segments of the light receiving means to allow the light receiving outputs to be read out in a decreasing level order; counting means for counting the number of the light receiving outputs read from the light receiving data storing means; data selecting means having a predetermined threshold value initially set therein, for selecting light receiving values for exposure calculation from the light receiving outputs read, in a decreasing level order, from the light receiving data storing means and based on the threshold value and count value of the counting means; exposure calculating means for performing the exposure calculation based on the light receiving values selectively output from the data selecting means; exposure control means for performing exposure control of the light receiving means in accordance with an exposure time calculated by the exposure calculating means; and image acquiring means for acquiring a taken image corresponding to the observed image from the light receiving outputs of the light receiving segments after the exposure control.

In a third aspect of the present invention, there is provided an imaging apparatus for microscope which comprises: image taking means having a plurality of color receiving segments arranged two-dimensionally for taking an observed image on the microscope; light measuring means having a plurality of color light receiving segments arranged two-dimensionally for receiving light corresponding to the observed image; extracting means for extracting light measuring outputs in a predetermined level range for a specific color from the color light measuring outputs coming from the respective light receiving segments of the light measuring means; exposure calculating means for performing an exposure calculation based on an average value of the light measuring outputs for a specific color extracted from the extracting means; and exposure control means for performing exposure control of the image taking means in accordance with an exposure time calculated by the exposure calculating means.

In a fourth aspect of the present invention, there is provided an imaging apparatus for a microscope which comprises: image taking means having a plurality of color light receiving segments arranged two-dimensionally for taking an observed image on the microscope; light measuring means having a plurality of color light receiving segments arranged two-dimensionally for receiving light corresponding to the observed image; light measuring data storing means for storing the light measuring outputs for a specific color from the light receiving segments of the light measuring means to allow the light measuring outputs to be read out in a decreasing level order; counting means for counting the number of the light measuring outputs read from the light measuring data storing means; data selecting means having a predetermined threshold value initially set therein, for selecting a light measuring value for an exposure calculation from the light measuring outputs read, in a decreasing level order, from the light measuring data storing means, based on the threshold value and count value of the counting means; exposure calculating means for performing the exposure calculation based on the light measuring value selectively output from the data selecting means; and exposure control means for performing exposure control of the image taking means in accordance with an exposure time calculated by the exposure calculating means.

In a fifth aspect of the present invention, there is provided an imaging apparatus for a microscope which comprises: light receiving means having a plurality of color light receiving segments arranged two-dimensionally for receiving light corresponding to the observed image on the microscope; extracting means for extracting light receiving outputs in a predetermined level range for a specific color out of the color receiving outputs from the respective light receiving segments of the light receiving means; exposure calculating means for performing an exposure calculation based on an average value of the light receiving outputs for a specific color extracted from the extracting means; exposure control means for performing exposure control of the light receiving means in accordance with an exposure time calculated by the exposure calculating means; and image acquiring means for acquiring a taken image corresponding to the observed image from color light receiving outputs of the color light receiving segments after the exposure control.

In a sixth aspect of the present invention, there is provided an imaging apparatus for a microscope which comprises: light receiving means having a plurality of color receiving segments arranged two-dimensionally for receiving light corresponding to an observed image on the microscope; light receiving data storing means for storing the light receiving outputs for a specific color from the respective light receiving segments of the light receiving means to allow the light receiving outputs to be read out in a decreasing level order; counting means for counting the number of the light receiving outputs read from the light receiving data storing means; data selecting means having predetermined threshold value initially set therein, for selecting light receiving values for an exposure calculation from the light receiving outputs read, in a decreasing level order, from the light receiving data storing means, based on the threshold value and count value of the counting means; exposure calculating means for calculating the exposure calculation based on the light receiving values selectively output from the data selecting means; exposure control means for performing exposure control of the light receiving means in accordance with an exposure time calculated by the exposure calculating means; and image acquiring means for acquiring a taken image corresponding to the observed image from color light receiving outputs of the light receiving segments after the exposure control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

The embodiments of the present invention will be explained below with reference to the accompanying drawing.

Figure 1:
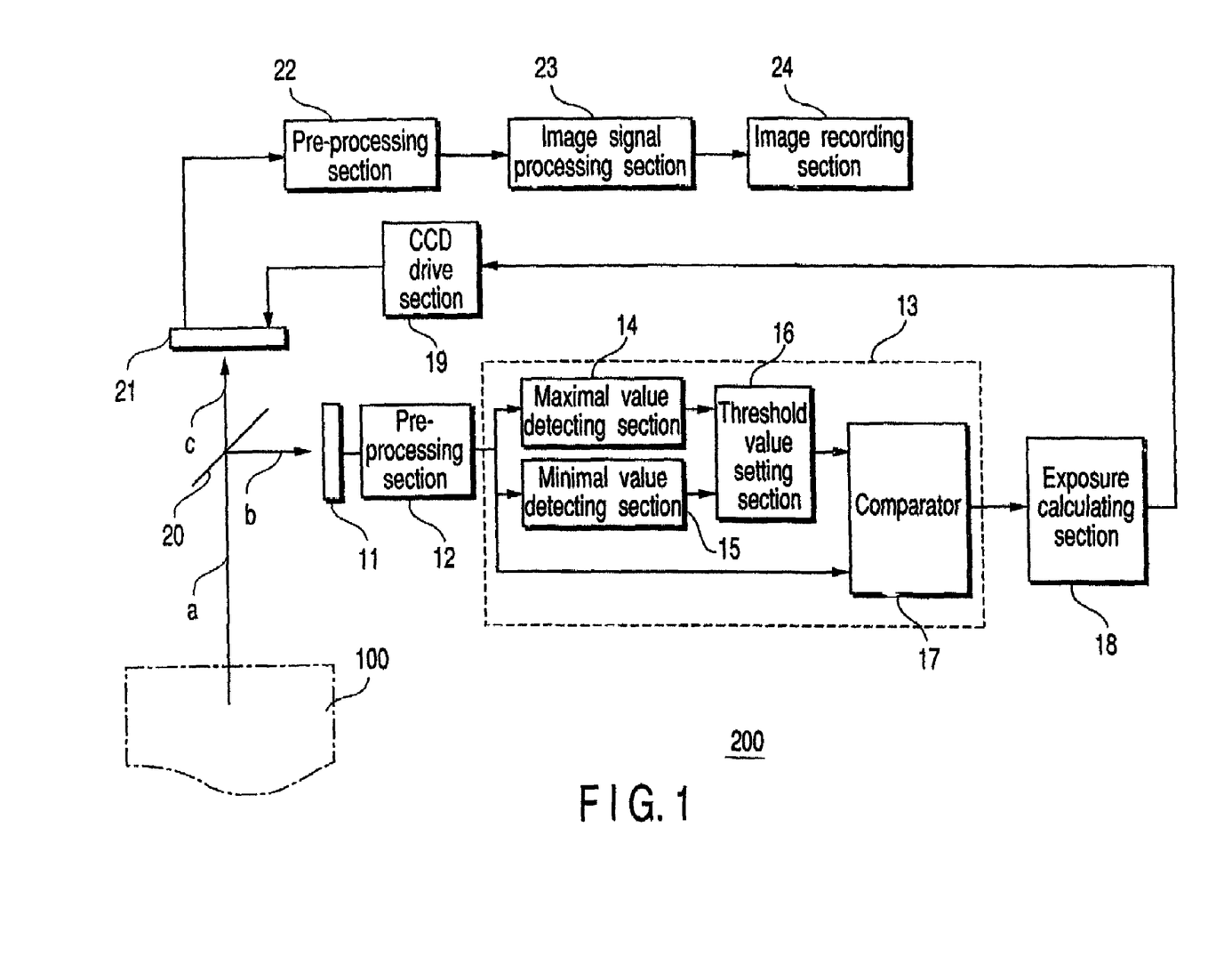
FIG. 1 is a schematic view showing a first embodiment of the present invention.

FIG. 1 shows a schematic view showing an imaging apparatus for a microscope to which the present invention is applied. In FIG. 1, an imaging apparatus 200 is connected to a microscope body 100 and an observed image on the microscope body 100 is conducted to the inside of the imaging apparatus 200 along an optical path a.

A prism 20 is arranged on the optical path a within the imaging apparatus 200. This prism 20 allows the observed image which is conducted along the optical path a from the microscope body 100 to be divided into two optical paths, that is, a reflection optical path b and a transmission optical path c.

Figure 2:
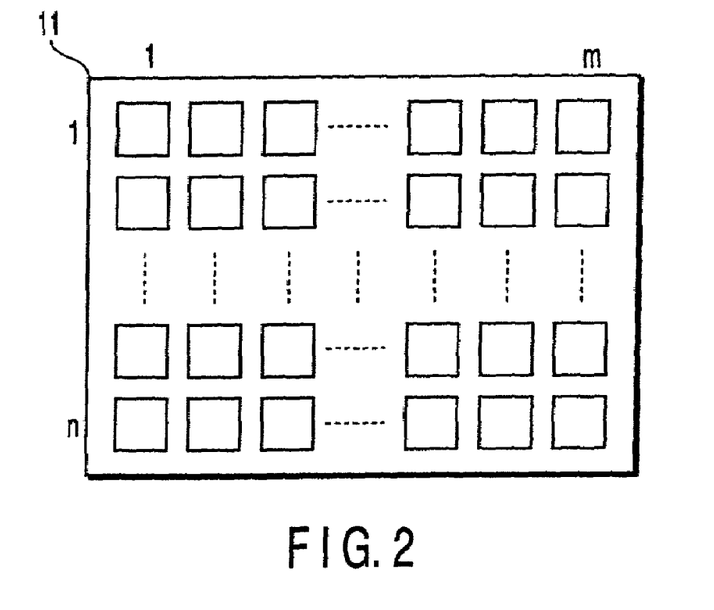
FIG. 2 is a schematic view showing a CCD used in the first embodiment of the present invention.

A CCD 11 is arranged on the reflection optical path b and receives light corresponding to the observed image which has been reflected on the prism 20 and then conducted onto the reflection optical path b. The CCD 11 is used as a light measuring means. The CCD 11 is comprised of a plurality of light receiving segments as a two-dimensional m pixels×n pixel array as shown in FIG. 2.

A pre-processing section 12 is connected to the CCD 11. The pre-processing section 12 outputs signal from the CCD 11 as an image signal.

An extraction section 13 is connected to the pre-processing section 12. The extraction section 13 comprises a maximal value detecting section 14, a minimal value detecting section 15, a threshold value setting section 16 and a comparator section 17. The image signal from the pre-processing section 12 is input to the maximal value detecting section 14, minimal value detecting section 15 and comparator section 17. The outputs of the maximal value detecting section 14 and minimal value detecting section 15 are input to the threshold value setting section 16. The threshold value which has been output from the threshold value setting section 16 is input to one input terminal of the comparator section 17.

An exposure calculating section 18 is connected to the comparator section 17. A result of comparison from the comparator section 17 in the extraction section 13 is input to the exposure calculating section 18. In addition, image taking conditions, such as a sensitivity setting and exposure correction, are supplied to the exposure calculating section 18 by an operation section, not shown. The exposure calculating section 18 calculates an exposure time based on these input values.

A CCD drive section 19 is connected to the exposure calculating section 18. The CCD drive section 19 drives a later-described image taking CCD 21 based on an exposure time calculated by the exposure calculating section 18.

On the transmission optical path c the image taking CCD 21 is arranged to allow an observed image to be projected thereon. The image taking CCD 21 is driven at a predetermined exposure time on the basis of the drive signal of the CCD drive section 19.

A pre-processing section 22 is connected to the image taking CCD 21 and it outputs, as an image signal, the signal which has been output from the CCD 11. The image signal from the pre-processing section 22 is supplied to an image signal processing section 23 where the signal processing, such as a white balance and gradation correction, is applied to the image signal. The processed signal is input to an image recording section 24 where it is recorded.

Now, an explanation will be made about the operation of the apparatus thus structured.

When the observed image on the microscope body 100 is conducted to the inside of the imaging apparatus 200 along the optical path a, the observed image is divided into the reflection optical path b and transmission optical path c by the prism 20 arranged on the optical path a.

The observed image conducted onto the reflection optical path b is projected onto the CCD 11. The CCD 11 outputs the observed image after being subjected to a photoelectric conversion. The output of the CCD 11 is converted to an image signal by the pre-processing section 12 after applying sampling processing, etc., and the outputs of the pre-processing section 12 are sequentially delivered for respective light receiving segments in the m×n array in a time sequential way. At each time of outputting a light measuring signal of all light receiving segments in the m×n array from the pre-processing section 12, that is, at each frame, a maximal value (Pmax) and minimal value (Pmin) are detected at the maximal value detecting section 14 and minimal value detecting section 15.

The maximal value (Pmax) and minimal value (Pmin) detected at the maximal value detecting section 14 and minimal value detecting section 15 are input to the threshold value setting section 16. The threshold value setting section 16 performs the following calculation with the use of an initially set coefficient α and finds a threshold value (Pth) for each frame.

$$Pth = \alpha P\max + (1-\alpha) P\min (0 \leq \alpha \leq 1)$$

Here, the efficiency α is previously found experimentally or empirically.

The threshold value found by the threshold value setting section 16 is input to the comparator section 17. To the comparator section 17 are sequentially input in a time sequential fashion the light measuring outputs of all the light receiving segments in the m×n array from the pre-processing section 12.

The comparator section 17 compares the threshold value input at each frame with the light measuring output of all the light receiving segments and makes a decision. The comparator 17 delivers a light measuring output of the light receiving segments satisfying a comparison decision condition. If, for example, the comparison decision condition is given as $P(i,k) \geq Pth$ (provided that P(i,k) is the light measuring output of each light receiving element, $1 \leq i \leq m$, $1 \leq k \leq n$), then only those light measuring outputs above the threshold value (Pth) are extracted out of the light measuring outputs of all the light receiving elements. The thus extracted light measuring outputs are supplied to the exposure calculating section 18.

The exposure calculation section 18 calculates an average value (Pave) of the supplied light measuring outputs by the following equation $$Pave = \Sigma Pk/N$$

where Pk denotes the light measuring outputs and N denotes the number of light measuring outputs as an object of calculation.

The exposure time is calculated based on the Pave found by the above equation and image taking condition set by the operation section not shown.

The relation of the brightness distribution state on a sample to the exposure calculation will be explained by way of example below by referring to FIG. 3.

Figure 3:
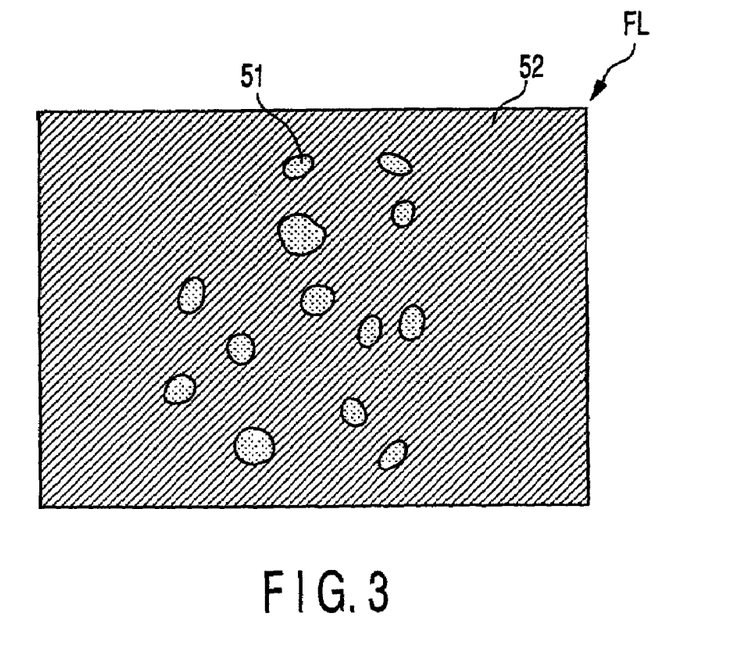
FIG. 3 shows one example of a fluorescent sample used in the first embodiment of the present invention.
Figure 4:
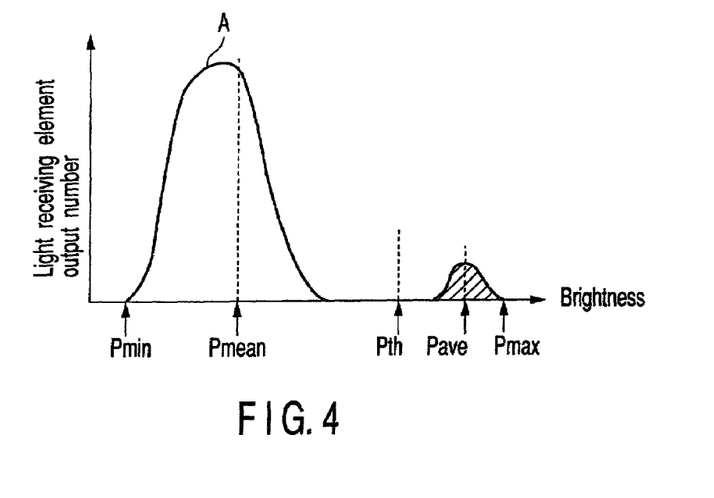
FIG. 4 is a view showing a light receiving segment distribution corresponding to brightness (light measuring outputs) in the first embodiment of the present invention.

Let it be considered that, as in the case of a fluorescent sample FL shown in FIG. 3 for instance, high brightness portions 51 of a fluorescent section are dotted in a dark background 52 of a low brightness. In such a case, many light receiving segments are present in the low brightness background and only fewer light receiving segments are present in the high brightness portions 51. In the brightness (light measuring outputs) distribution of the light receiving segments, there exist low brightness area A and high brightness area B as shown in FIG. 4. In the case of the fluorescent sample FL shown in FIG. 3, the distribution is of such a type that, as shown in FIG. 4, there exist many light receiving segments producing light measuring outputs of a low brightness and fewer light receiving segments producing light measuring outputs of a high brightness with no light receiving segments producing light measuring outputs of a middle brightness.

In the present embodiment, for example, the threshold value Pth is set near the middle brightness area by the threshold value setting section 16. And the present embodiment extracts only the light measuring outputs (the cross-hatched portion in FIG. 4) above the threshold value Pth and finds the average value Pave from them and utilizes it for the calculation of the exposure time. As a result, it is possible to set the exposure to the high brightness portions 51 of a light radiance section in the fluorescent sample FL shown in FIG. 3 and, hence, to make an exposure calculation optimal to the image taking of the high brightness portions 51.

The exposure time calculated by the exposure calculating section 18 is input to the CCD drive section 19. Based on the input exposure time, the CCD drive section 19 outputs a control signal to the CCD 21 for taking an image on a microscope. The image taking CCD 21 allows the observed image which is projected along the optical path c to be subjected to a photoelectric conversion and outputs it. The output of the CCD 21 is supplied to the pre-processing section 22 where it is converted to an image signal. The image signal is input to the image signal processing section 23 where it is subjected to signal processing, such as the white balance processing, gradation correction processing and data generation for image recording. By a release operation for taking an image on the microscope done by the operation section not shown, the image signal processing section 23 records the observed image in the image recording section 24.

In the present embodiment, as set out above, the threshold value Pth is found from the maximal value and minimal value of the measuring outputs of all the light receiving segments. And the exposure calculation is made from the average value Pave of only the light measuring outputs extracted based on the threshold value Pth. It is, therefore, possible to calculate an exposure time fitted to a portion of interest on the sample and to take an observed image with an optimal exposure and record it.

Although, in the present embodiment, the prism 20 is used to divide the optical path into the optical path for the CCD 11 and optical path for the image taking CCD 21, a mirror may be provided in place of the prism 20. In this case, at the light measuring/exposure calculation time, the observed image is reflected onto the optical path b by the mirror and projected onto the CCD 11. When the image taking operator gives a release operation to the present apparatus from the operation section not shown, the mirror is removed from the optical path a and the observed image is projected via the optical path c onto the image taking CCD 21 and, by the above-mentioned operation, recorded.

Further, although, in the present embodiment, the comparison decision condition at the comparator section 17 is set to $P(i,k) \geq Pth$, the present embodiment is not restricted thereto and the condition is properly variable. If, on the other hand, the distribution of the brightness of the sample is in a state inverted relative to that of FIG. 3, that is, the low brightness portions are dotted in a high brightness background and further an exposure is to be set to the dotted low brightness portion, the same effect as set out above is obtained when the above-mentioned comparison decision condition is given to $P(i,k) \geq Pth$.

Further, the same functions as set out in connection with the above-mentioned extraction section 13 and exposure calculation section 18 may be imparted to a personal computer (PC) and an apparatus-equipped CPU in which case these are processed by software. The coefficient α for calculating the threshold value Pth may be made variable and freely set by the operator.

Figure 5:
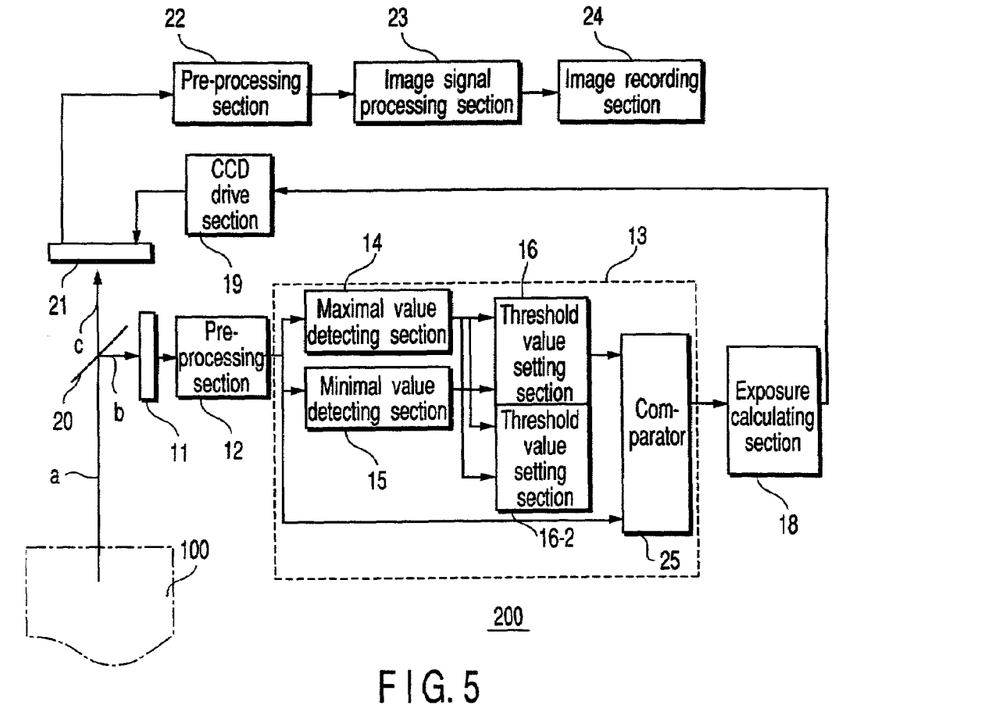
FIG. 5 is a schematic view showing a second embodiment of the present invention.

FIG. 5 is a schematic diagram showing a second embodiment of the present invention. The second embodiment is the same as the first embodiment except in terms of an inner structure of the extraction section 13. The same reference numerals are employed in this embodiment to designate parts or elements corresponding to these in FIG. 1 and an explanation will be made about different portions.

In the second embodiment, the outputs of a maximal value detecting section 14 and minimal value detecting section 15 are input to threshold value setting sections 16-1 and 16-2, respectively. The threshold values of both the outputs of the threshold value setting sections 16-1 and 16-2 are input to a comparator section 25 where the light measuring output is extracted with the use of the two threshold values.

With the use of those initially set coefficients α1 and α2 (α1<α2), the threshold value setting sections 16-1 and 16-2 perform the following calculations to decide threshold values (Pth1, Pth2).

$$Pth1 = \alpha 1 Pmax + (1-\alpha 1) Pmin (0 \leq \alpha 1 \leq 1)$$

$$Pth2 = \alpha 2 Pmax + (1-\alpha 2) Pmin (0 \leq \alpha 2 \leq 1)$$

To the comparator section 25 are sequentially input not only these threshold values (Pth1, Pth2) but also light measuring outputs of all light receiving segments in a m×n array coming from a pre-processing section 12. And a comparison is performed under an initially set comparison condition $Pth1 \leq P(i,k) \leq Pth2$. Of those light measuring outputs supplied from the pre-processing section 12, only those light measuring outputs satisfying the comparison condition are output to the exposure calculating section 18 where only those light measuring outputs present between the threshold value Pth1 and the threshold value Pth2 are averaged and, based on the average value Pave, the exposure time is calculated.

Figure 6:
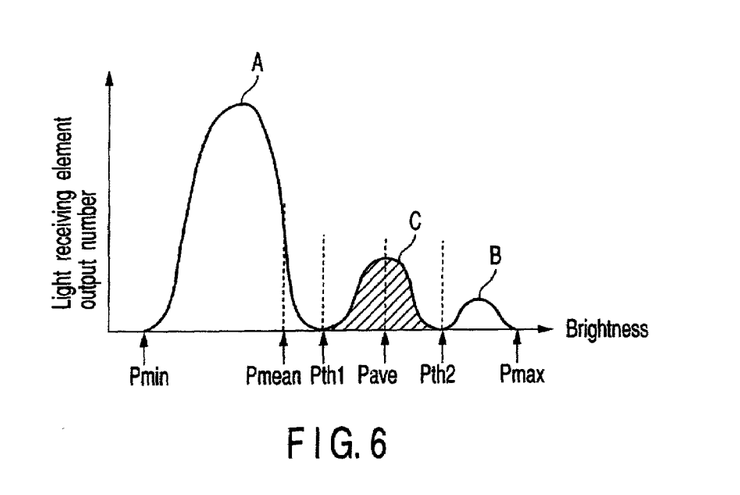
FIG. 6 is a view showing a light receiving segment distribution corresponding to brightness (light measuring outputs) in the second embodiment of the present invention.

Now the relation between the brightness distribution state on a sample and the exposure calculation will be explained below by referring to FIG. 6.

On the sample, there exists a light radiance portion distribution at three areas of a low brightness area A, a middle brightness area C and high brightness area B. For such a sample, the threshold values (Pth1, Pth2) are so set as to select a light measuring output of the middle brightness area C. By setting such two threshold values (Pth1, Pth2), it is possible to calculate the exposure time only at a light radiance portion other than those light measuring outputs from a high brightness area originating from a defect, dirt, etc., on the sample and a low brightness area on the background of the sample.

In the embodiment thus structured, even if a defect, dirt, etc., are present on the sample FL in FIG. 3, it is possible to set an exposure to high brightness portions 51 of a light radiance portion of interest.

Although, in the above-mentioned embodiment, the two threshold values are so set as to sandwich the middle brightness area C, it is possible to obtain threshold values of the first embodiment if α1 and α2 are varied. If, for example, the above-mentioned α2 is set to α2=1, then the threshold values Pth2=Pmax and it is possible to obtain the same effect as in the above-mentioned first embodiment. If α1=0, then the threshold value Pth1=Pmin and it is possible to obtain the same effect as in the case where the comparison decision condition at the first embodiment is set to $P(i,k) \leq Pth$.

Figure 7:
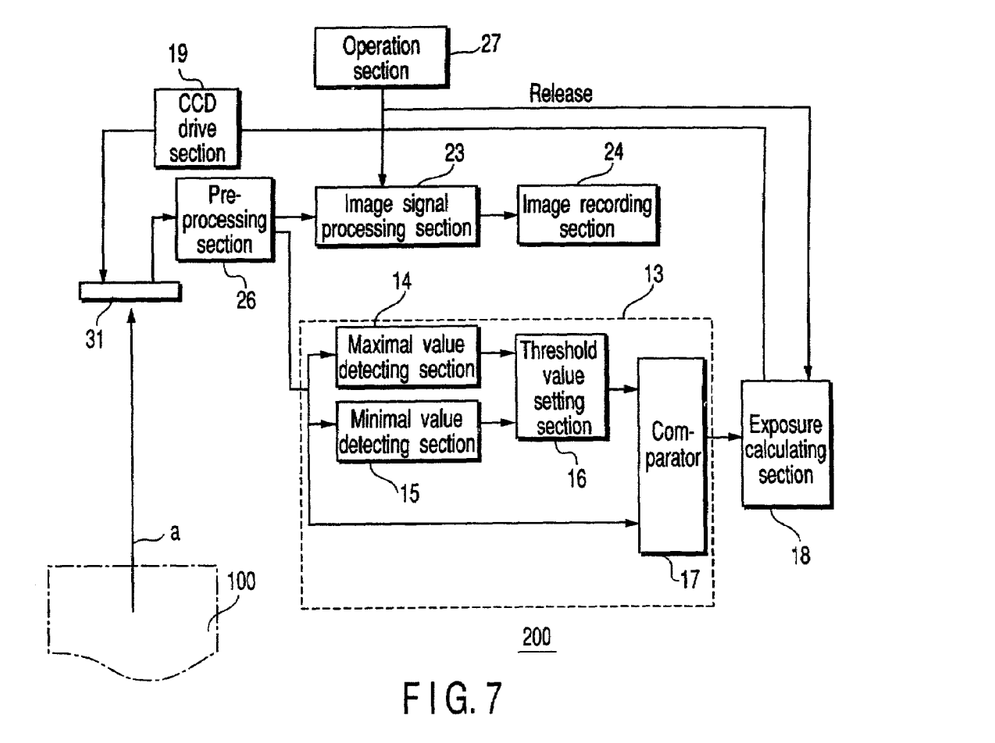
FIG. 7 is a schematic view showing a third embodiment of the present invention.

FIG. 7 is a schematic view of a third embodiment of the present invention. This embodiment is the same as the first embodiment except that the image taking CCD 21 shown in FIG. 1 shares the function of the CCD 11. The same reference numerals are employed to designate parts or elements corresponding to those in FIG. 1 and an explanation will be made below about only a different portion.

A CCD 31 sharing both the functions of the image taking CCD 21 and CCD 11 in FIG. 1 is arranged on an optical path a. An observed image on the microscope body 100 leads to the CCD 31 via the optical path a. It is given that the CCD 31 is comprised of a color CCD having a two-dimensional array of light receiving segments. In the CCD 31, the observed image is subjected to a photoelectric conversion and output to a pre-processing section 26 where the output of the CCD 31 is converted to an image signal and a brightness signal is generated from the color signal. Those light measuring values of respective light receiving segments on the CCD 31 are sequentially output to an extraction section 13 in a time sequential way. Based on the output of the pre-processing section 26 the extraction section 13 performs the same function as in the first embodiment.

Figure 8:
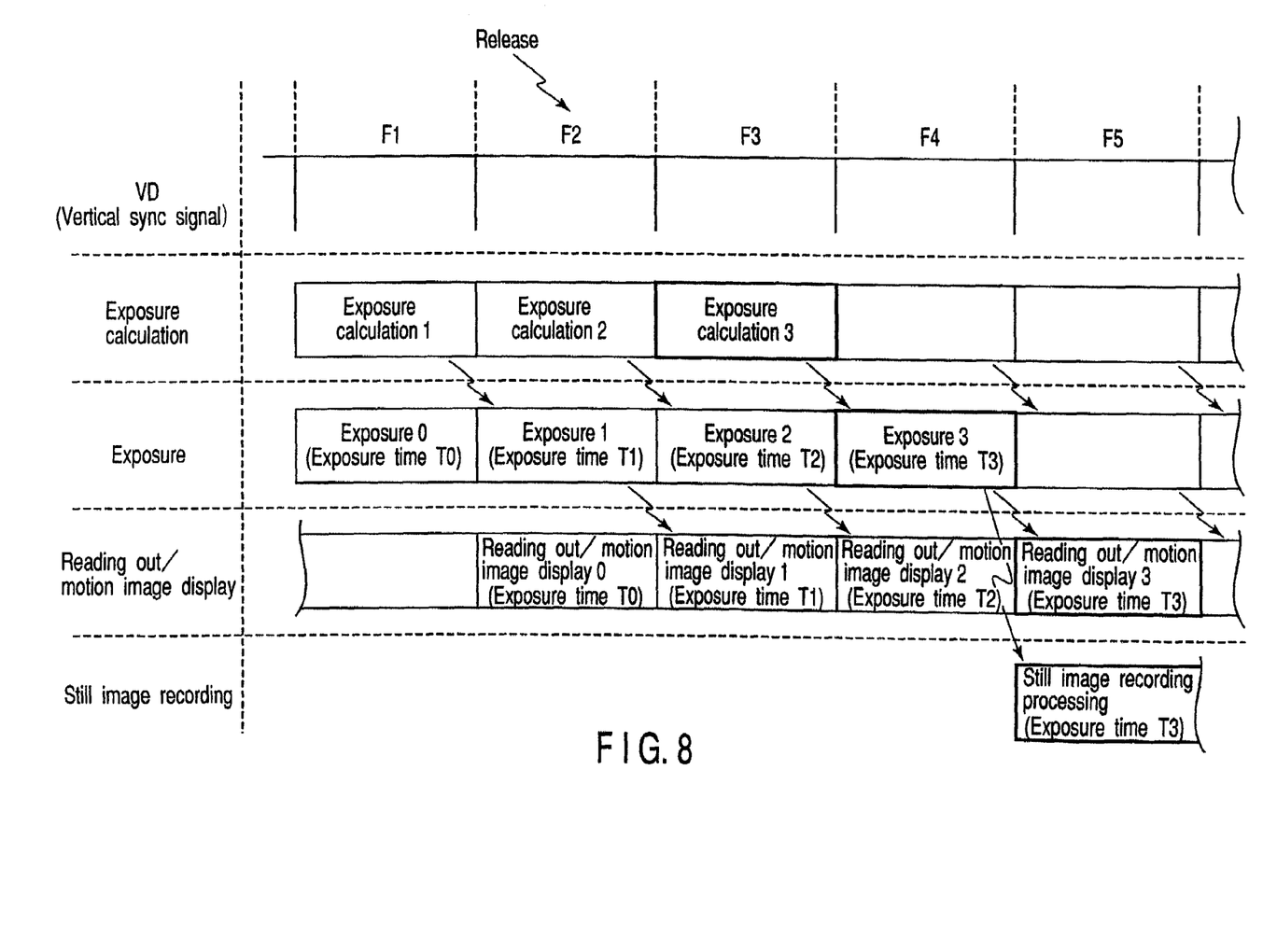
FIG. 8 show an image recording sequence diagram.

FIG. 8 is a sequential diagram showing image recording.

Here, the operator performs a release operation on an operation section 27. Let it be assumed that the release operation is performed at a frame F2 shown in FIG. 8. By this operation, an exposure calculation section 18 calculates an exposure time T3 in a frame F3 and sets it in a CCD drive section 19. At a frame F4, the CCD drive section 19 drives the CCD 31 based on the set exposure time T3 and the CCD 31 performs an exposure operation at the exposure time T3.

At a frame F5, an image exposed at the exposure time T3 is read out from the CCD 31 and input through the pre-processing section 26 to an image signal processing section 23 and an image on the microscope is recorded in an image recording section 24.

On the other hand, the output of the CCD 31 is input through the pre-processing section 26 to the image signal processing section 23 and the image on the microscope is recorded in the image reading section 24.

In the embodiment thus structured, even if one CCD 31 serves both the functions for image taking and light measuring, it is possible to calculate an exposure time for taking an image of a portion of interest on the sample and to take an observed image under optimal exposure. It is also possible to obtain a simpler structure at a low cost since use is made of a single CCD 31.

Although, as set out above, a calculated exposure time is set in the CCD drive section 19 when the release operation is done by the operator, the calculated exposure time may be set in the CCD drive section 19 either at each frame or sequentially every few frames. An explanation will be made below about an example of performing such a feedback by referring to FIGS. 9 and 10.

Figure 9:
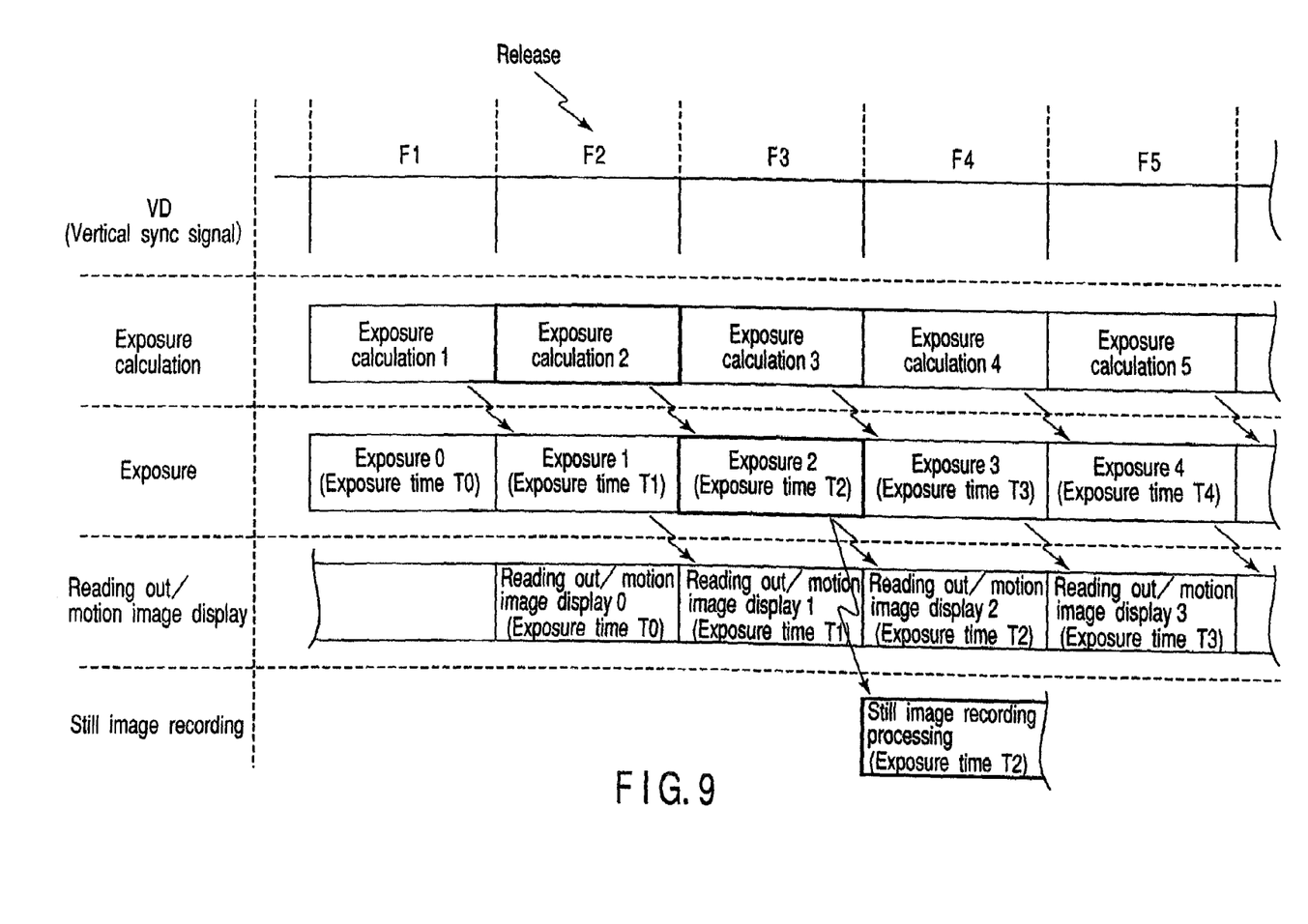
FIG. 9 is a sequence diagram showing a first variant associated with image recording.

FIG. 9 is a sequence diagram of a first variant relating to image recording.

An exposure time T1 calculated at a frame F1 is set in the CCD drive section 19 at a frame F2 and the CCD 31 is driven at the exposure time T1. And at a frame F3 an image exposed at the exposure time T1 is read out from the CCD 31 and displayed.

An exposure time T2 calculated at the frame F2 is set in the CCD drive section 19 at a frame F3 and the CCD 31 is driven at the exposure time T2. An image exposed at the exposure time T2 is read out from the CCD 31 and displayed at a frame 4. This operation is performed at each frame and it is possible to drive the CCD 31 at a sequential optimal exposure time.

Let it be assumed that, during a portion of such an exposure control operation, a release operation is performed at a frame 2 by the operator through the operation section 27. In this case, the exposure time T2 calculated at the frame F2 is set in the CCD drive section 19 at the frame F3 and the CCD 31 is driven at the exposure time T2. At the frame F4, an image exposed at the exposure time T2 is read out from the CCD 31 and input through the pre-processing section 26 to the image signal processing section 23 and recorded in the image recording section 24. By this operation it is possible to record an image on the microscope at a time shorter by one frame than that in FIG. 8.

Figure 10:
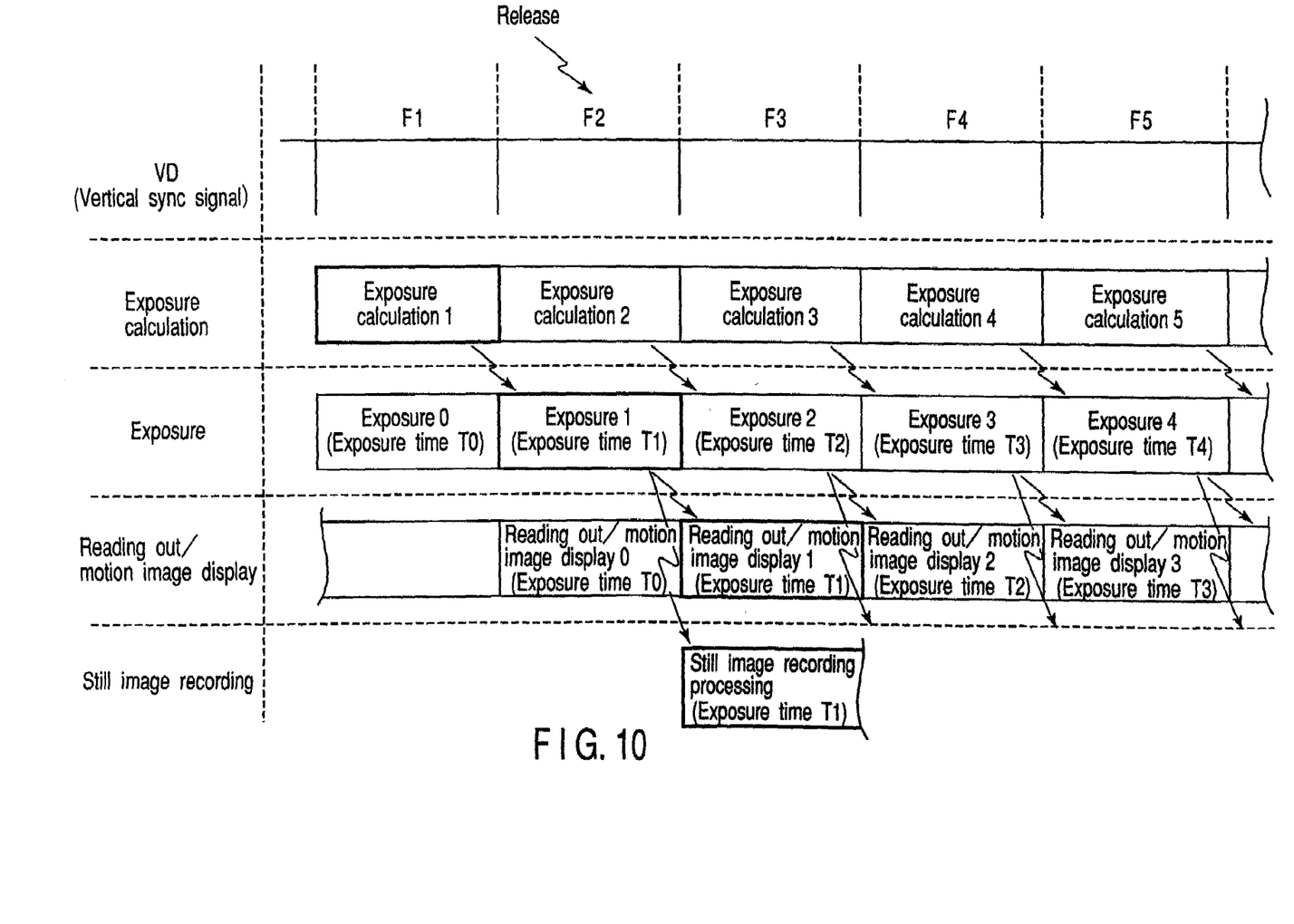
FIG. 10 is a sequence diagram showing a second variant associated with image recording.

FIG. 10 is a sequence diagram showing a second variant associated with image recording.

Let it be assumed that, at a frame F2, a release operation is performed by the operator through the operation section 27. At this time, the CCD 31 is driven at an exposure time calculated at a previous frame F1. At a frame F3, an image exposed at an exposure time T1 is read out from the CCD 31 and input through the pre-processing section 26 to the image signal processing section 23 and a microscopic image is recorded in the image recording section 24. By this operation it is possible to record the microscopic image at a time far shorter by one frame than in FIG. 9.

As another variant, respective color signals R, G, B may be output instead of the brightness signal from the pre-processing section 26 to the extraction section 13. In this case, maximal and minimal values of R, G, B are detected at the maximal and minimal value detecting sections 14 and 15 and output to a threshold value setting section 16. The threshold value setting section 16 selects the colors optimal to the extraction condition from R, G, B and sets the threshold values relative to the selected color signals. A comparator section 17 compares the threshold value with a signal for a color selected by the threshold value setting section 16 from each signal R, G, B received from the pre-processing section 26 and delivers, to the exposure calculation section 18, a corresponding light measuring output of the light receiving segment satisfying the comparison decision condition.

Under this operation, it is possible to calculate an exposure time at which, on a fluorescent sample often emitting a radiation in a monochromatic system, an exposure is set to its characteristic light radiance portion. By doing so it is possible to record an observed image taken with an optimal exposure.

Figure 11:
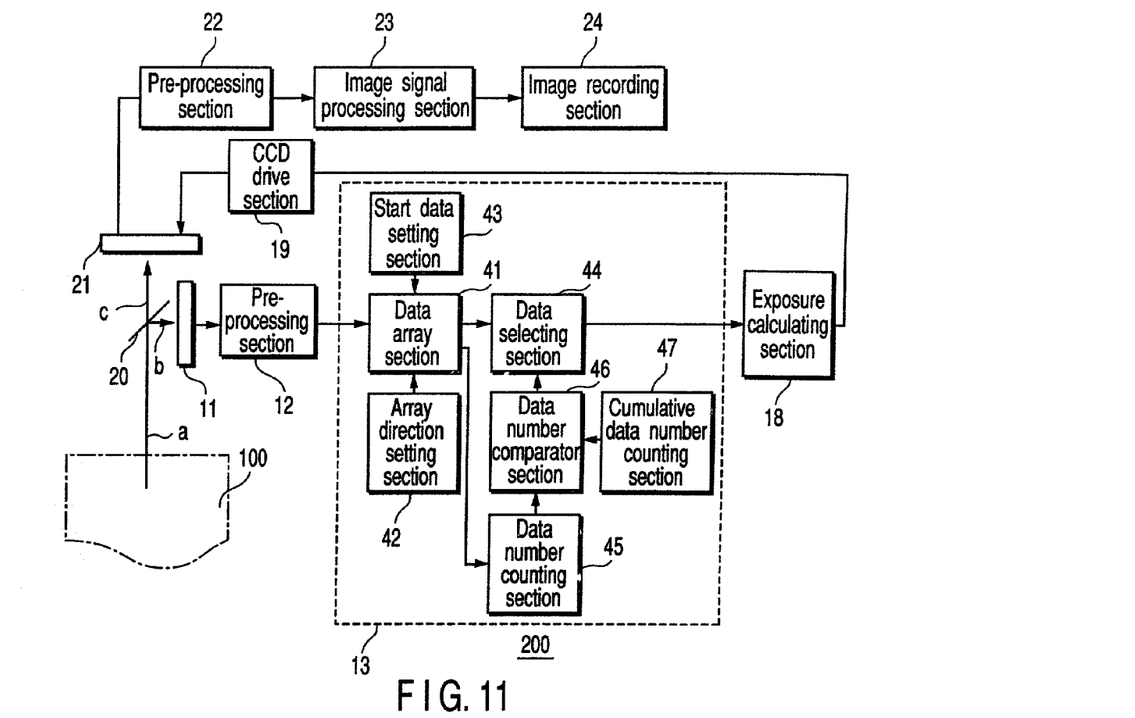
FIG. 11 is a schematic view showing a fourth embodiment of the present invention.

FIG. 11 is a schematic view showing a fourth embodiment of the present invention. The same reference numerals are employed here to designate parts or elements corresponding to those shown in FIG. 1 and an explanation will be made about a different portion only.

A light measuring output from a pre-processing section 12 is input to a data array section 41 constituting a light measuring data storing means in an extraction section 13. The data array section 41 arranges/stores data in a decreasing order of, for example, brightness values in an array direction designated by an array direction setting section 42. Further, the data array section 41 delivers the stored light measuring outputs sequentially, in an arrayed order (for example, in a decreasing brightness value order) from a reading-out position designated from a start data setting section 43.

The start data setting section 43 arbitrarily designates data (start data) corresponding to a read-out start position of the data array section 41 as a maximal value or a minimal value, etc. In the explanation below, it is assumed that the start data setting section 43 is so configured as to set the maximal value.

The light measuring outputs read from the data array section 41 are input to a data selecting section 44 and to a data counting section 45. The data counting section 45 counts the output numbers of light receiving elements each time the light measuring outputs are read out to the data selecting section 44. The count value is output to a data number comparator section 46.

An initially set cumulative data number is input as a threshold value from a cumulative data number setting section 47 to the data number comparing section 46 where comparison is made between the cumulative data number and a count value sequentially sent from the data counting section 45. The data number comparator section 46 allows the delivery of the light measuring outputs to the data selecting section 44 until the count value exceeds the cumulative data number. The outputting of the data selecting section 44 is stopped at a time of exceeding the set cumulative data number. Here, the cumulative data number (Nth) initially set by the data number comparator section 46 is set by the following equation.

$$Nth=\beta N$$

($0 \leq \beta \leq 1$, N: all light receiving element number)

Under such an operation, the light measuring outputs from the data array section 41 are sequentially read out starting with the light measuring output of the maximal value and input to the data selecting section 44. Further, the light measuring outputs supplied to the data selecting section 44 are allowed to be delivered to an exposure calculating section 18 until the cumulative data number (Nth) is reached from the starting of a read-out operation. By doing so, the exposure time is calculated, by the exposure calculation section 18, with an average value Pave of those light measuring outputs involved from the maximal value of the light measuring outputs down to the cumulative data number (Nth).

Figure 12:
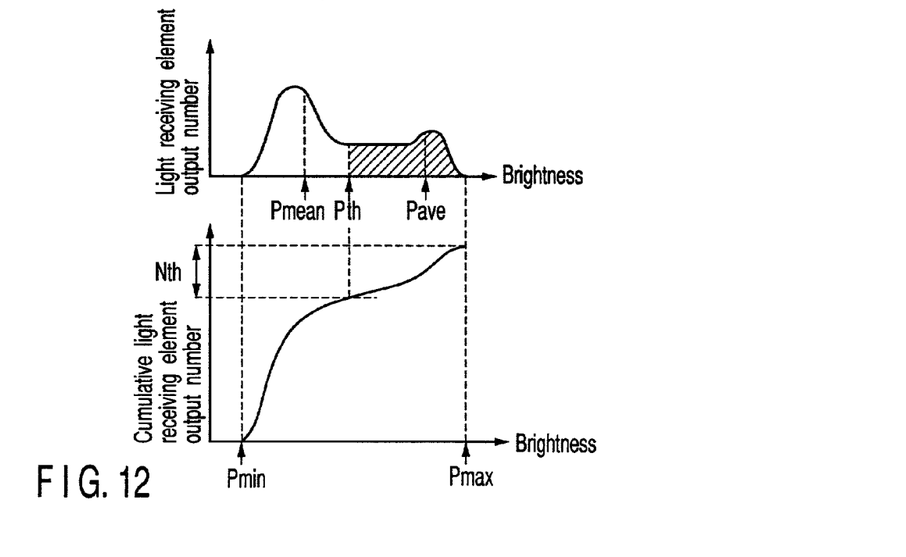
FIG. 12 is a view showing a correspondence relation among a sample brightness distribution state, a light receiving element output number and a cumulative light receiving element number in the fourth embodiment of the present embodiment.

The correspondence relation of the standard brightness distribution state to the output number of the light receiving elements and to the output number of the cumulative light receiving elements is as shown in FIG. 12. The light receiving element outputs (light measuring values) averaged and becoming a target of an exposure time calculation are indicated by the cross-hatched brightness area in FIG. 12. That is, it is possible to obtain the same advantage as in the above-mentioned first embodiment. Further, if the start data setting section 43 is set to a minimal value, it is possible to obtain the same advantage as in the case where the decision condition at the first embodiment is made P(i,k)$\leq$Pth.

The present invention is not restricted to the above-mentioned embodiments and various changes or modifications of the invention can be made within a range not departing from the essence of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus for a microscope, comprising:
an imaging device which is operated in synchronism with a periodically generated vertical synchronous signal to perform an exposure operation to obtain an image signal in each of a plurality of frames defined by the periodically generated vertical synchronous signal and to output the image signal for each frame;
an exposure calculating section which measures light at a plurality of points in an image based on the image signal output from the imaging device, and which decides an exposure time for the imaging device according to a microscopy operation;
an exposure controlling section which sets, every at least one frame, an exposure time decided by the exposure calculating section, and which controls the exposure operation of the imaging device in synchronism with the periodically generated vertical synchronous signal in accordance with the set exposure time;
a reading section which, for each image signal output by the imaging device, reads the image signal in synchronism with a next vertical synchronous signal after the exposure operation of the imaging device for obtaining the image signal is completed, and which outputs each read image signal for moving image display; and
a still image recording section which, when a release signal that is independent of the periodically generated vertical synchronous signal is generated, simultaneously reads and records on a recording medium the image signal generated in one of: a same frame as a frame in which the release signal is generated, and a next frame after the frame in which the release signal is generated;
wherein the exposure calculating section compares each of light measuring values (P), of the plurality of points at which the light is measured, with at least one threshold value (Pth) calculated by the formula:

$$Pth=\alpha P\max+(1-\alpha)P\min$$

where Pmax is a maximal value calculated from the light measuring values P, Pmin is a minimum value calculated from the light measuring values P, and $\alpha$ is an initially set coefficient; and wherein the exposure calculating section decides the exposure time of the imaging device based on an average value (Pave) of the light measuring values selected by the comparison with the threshold value (Pth), which is performed according to a criterion previously adjusted according to the microscopy operation.

2. The imaging apparatus according to claim 1, wherein the coefficient $\alpha$ satisfies the formula:

$$0 \leq \alpha \leq 1.$$

3. The imaging apparatus according to claim 1, wherein the average value (Pave) is given by the calculation:

$$Pave=\Sigma P/N$$

where N denotes a number of the light measuring values (P) selected by the comparison with the threshold value (Pth), and P denotes the selected light measuring values.

4. The imaging apparatus according to claim 1, wherein all light measuring values (P) greater than or equal to the threshold value (Pth) are selected in accordance with the previously adjusted criterion.

5. The imaging apparatus according to claim 1, wherein all light measuring values (P) less than or equal to the threshold value (Pth) are selected in accordance with the previously adjusted criterion.

6. The imaging apparatus according to claim 1, wherein the exposure calculating section starts deciding the exposure time for the exposure operation to obtain the still image signal corresponding to the release signal within the frame in which the release signal is generated.

* * * * *